(12) United States Patent
Ji et al.

(10) Patent No.: US 8,521,213 B2
(45) Date of Patent: *Aug. 27, 2013

(54) SERVING SECTOR INTERFERENCE BROADCAST AND CORRESPONDING RL TRAFFIC POWER CONTROL

(75) Inventors: Tingfang Ji, San Diego, CA (US); Rajat Prakash, La Jolla, CA (US); Alexei Gorokhov, San Diego, CA (US); Mohammad J. Borran, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,008

(22) Filed: May 3, 2012

(65) Prior Publication Data
US 2012/0252523 A1 Oct. 4, 2012

Related U.S. Application Data

(62) Division of application No. 11/851,153, filed on Sep. 6, 2007, now Pat. No. 8,195,097.

(60) Provisional application No. 60/843,040, filed on Sep. 8, 2006.

(51) Int. Cl.
*H04B 7/00* (2006.01)
(52) U.S. Cl.
USPC .............. 455/522; 455/69; 455/70; 370/315; 370/316; 370/317; 370/318; 370/319

(58) Field of Classification Search
USPC .............. 455/522, 69–70; 370/315–320
See application file for complete search history.

(56) References Cited

U.S. PATENT DOCUMENTS

| 6,006,073 | A | 12/1999 | Glauner et al. |
| 6,519,705 | B1 | 2/2003 | Leung |
| 7,009,944 | B1 | 3/2006 | Hulbert |
| 7,606,300 | B2 | 10/2009 | Lim |
| 8,195,097 | B2 | 6/2012 | Ji et al. |

(Continued)

FOREIGN PATENT DOCUMENTS

| EP | 1315310 A2 | 5/2003 |
| JP | 10065604 A | 3/1998 |
| WO | 0025444 A1 | 5/2000 |
| WO | 2006007318 A1 | 1/2006 |

OTHER PUBLICATIONS

Hosein, "Interference Management of OFDMA Uplinks," IEEE 65th Vehicular Technology Conference, VTC2007—Spring, pp. 2435-2439, Apr. 22-25, 2007.

(Continued)

*Primary Examiner* — Fayyaz Alam
(74) *Attorney, Agent, or Firm* — Mary A. Fales

(57) ABSTRACT

Systems and methodologies are described that facilitate broadcasting an interference level and adjusting transmit power corresponding to a reverse link in accordance with the interference level. An interference indication can be broadcasted on a broadcast channel in a wireless communication system. In response to the broadcast, mobile devices can adjust transmit power on the reverse link based upon considerations of the interference level. Further, mobile devices can evaluate an initial set point of a transmit power level during periods of inactivity.

17 Claims, 12 Drawing Sheets

(56) References Cited

U.S. PATENT DOCUMENTS

| | | |
|---|---|---|
| 2002/0077138 A1 | 6/2002 | Bark et al. |
| 2004/0223085 A1 | 11/2004 | Kwak |
| 2004/0259560 A1 | 12/2004 | Hosein et al. |
| 2005/0283687 A1 | 12/2005 | Sutivong et al. |
| 2006/0019694 A1 | 1/2006 | Sutivong et al. |
| 2006/0234752 A1 | 10/2006 | Mese et al. |
| 2008/0014979 A1 | 1/2008 | Gorokhov et al. |
| 2008/0032732 A1* | 2/2008 | Hosein .................. 455/522 |

OTHER PUBLICATIONS

International Search Authority—PCT/US07/077921, International Search Authority—European Patent Office—Jan. 30, 2008.
Taiwan Search Report—TW096133632—TIPO—Feb. 27, 2012.
Written Opinion—PCT/US07/077921, International Search Authority—European Patent Office, Munich—Jan. 30, 2008.

* cited by examiner

SERVING SECTOR INTERFERENCE BROADCAST AND CORRESPONDING RL TRAFFIC POWER CONTROL

CROSS-REFERENCE TO RELATED APPLICATIONS

This application claims the benefit of U.S. Provisional Patent application Ser. No. 60/843,040 entitled "METHODS AND APPARATUS FOR SERVING SECTOR INTERFERENCE BROADCAST AND A CORRESPONDING RL TRAFFIC POWER ADJUSTMENT" which was filed Sep. 8, 2006. The entirety of the aforementioned application is herein incorporated by reference.

The present application for patent is a divisional and claims priority from Utility patent application Ser. No. 11/851,153, filed Sep. 6, 2007, entitled "SERVING SECTOR INTERFERENCE BROADCAST AND CORRESPONDING RL TRAFFIC POWER CONTROL" and is assigned to the assignee hereof and hereby expressly incorporated by reference herein.

BACKGROUND

I. Field

The following description relates generally to wireless communications, and more particularly interference broadcast and reverse link power adjustment.

II. Background

Wireless networking systems have become a prevalent means by which a majority of people worldwide communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Typically, each access point supports terminals located within a specific coverage area referred to as a sector. A sector that supports a specific terminal is referred to as the serving sector. Other sectors, not supporting the specific terminal, are referred to as non-serving sectors. Terminals within a sector can be allocated specific resources to allow simultaneous support of multiple terminals. However, transmissions by terminals in neighboring sectors are not coordinated. Consequently, transmissions by terminals at sector edges can cause interference and degradation of terminal performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects and corresponding disclosure thereof, various aspects are described in connection with facilitating adjusting transmit power levels for the reverse link in mobile devices based upon considerations of a level of interference in a wireless communication system. In particular, an indication of interference (e.g., an interference level and/or a function of the interference level) can be broadcasted by a serving base station on a broadcast channel to a plurality of mobile devices. The mobile devices utilize the broadcasted interference indication, among other things, to modify transmit power for reverse link transmissions.

According to related aspects, a wireless communications system employing serving sector broadcast and reverse link power control is described herein. In an aspect, a method that facilitates generating an interference indication in a wireless communications system, comprises measuring a received interference level, determining a function of the received interference level and broadcasting the function of the received interference level on a physical channel to a plurality of mobile devices to enable quick power adjustment.

In accordance with another aspect, a wireless communications apparatus comprises a memory that retains instructions related to determining an interference value associated with other sector interference, developing a function of the interference value and broadcasting the function with low latency to a plurality of mobile devices and an integrated circuit coupled to the memory, configured to execute the instructions retained in the memory.

In accordance with yet another aspect, a wireless communications apparatus that generates an interference indication comprises means for identifying an interference level, means for evaluating a function of the interference level and means for transmitting the function of the interference level in a small number of slots to one or more mobile devices to enable power adjustment.

According to another aspect, a computer-readable medium comprises code for causing a computer to measure interference received at a base station, code for causing a computer to generate a function of an interference level value derived from the measured interference and code for causing a computer to broadcast the function on a physical broadcast channel in a small number of slots to a plurality of mobile devices.

In accordance with another aspect, in a wireless communication system, an apparatus comprises an integrated circuit configured to determine an interference value related to the amount of interference received from non-serving sectors and package the interference value as a function of the value.

According to yet another aspect, a method that facilitates adjusting power based upon interference information comprises receiving an interference indication, evaluating a power adjustment value based at least in part on the received interference indication and adjusting transmit power on the reverse link based upon the power adjustment value.

In accordance with another aspect, a wireless communications apparatus comprises a memory that retains instructions related to processing an interference value on a broadcast channel, inferring a power adjustment value based upon the interference value and changing a power level according to the power adjustment value and an integrated circuit coupled to the memory, configured to execute the instructions retained in the memory.

According to another aspect, a wireless communications apparatus that adjusts power on a reverse link comprises means for receiving an interference indication from a broadcast channel, means for determining a power adjustment value based upon the interference indication and means for modifying a transmit power level in accordance with the determined power adjustment value.

In accordance with yet another aspect, a computer-readable medium comprises code for causing a computer to receive a broadcasted interference value, code for causing a computer to evaluate a power correction parameter based at least in part on the received interference value and code for causing a computer to modify transmit power on the reverse link based upon the power correction value.

In accordance with another aspect, in a wireless communication system, an apparatus comprises an integrated circuit configured to evaluate a power adjustment quantity based at least in part upon consideration of broadcasted interference values related to non-serving sectors and adjust a transmit power level on a reverse link in accordance with the power adjustment quantity.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
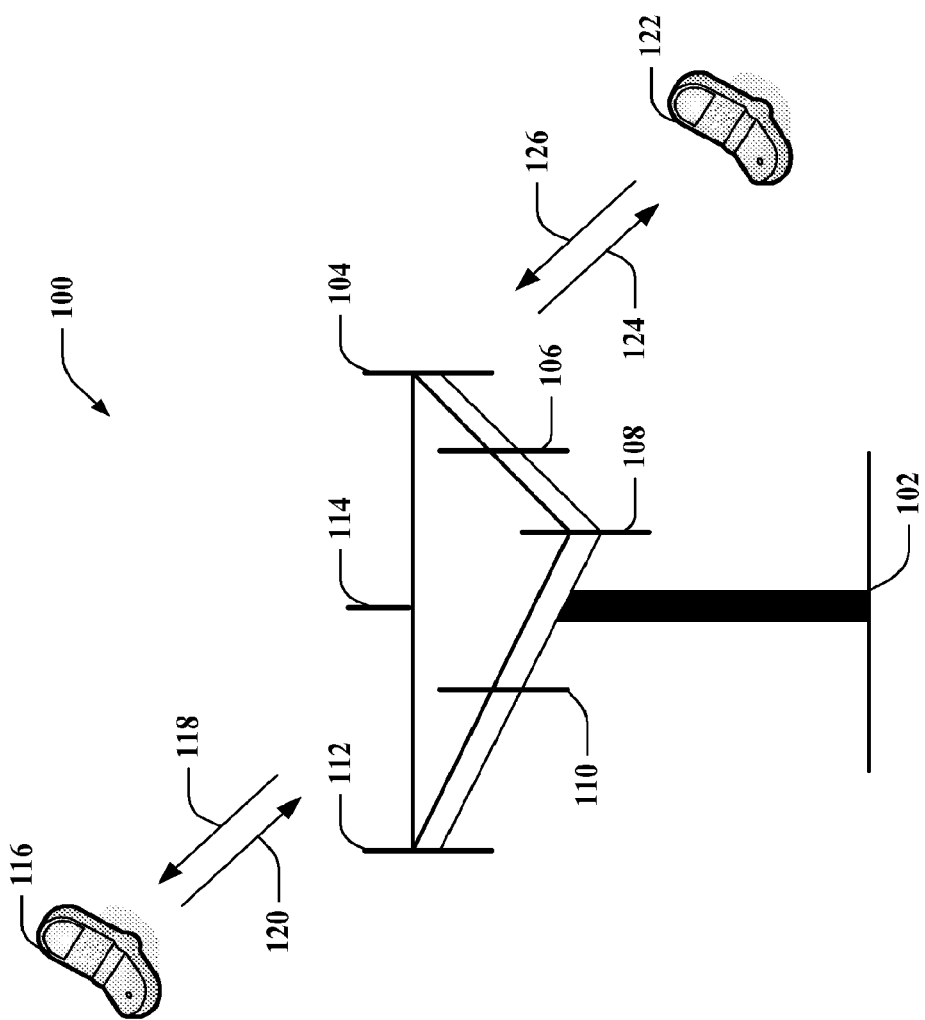
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additional include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

Each group of antennas and/or the area in which they are designated to communicate may be referred to as a sector of base station 102. For example, antenna groups may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices. According to an example, system 100 may be a multiple-input multiple-output (MIMO) communication system. Further, system 100 may utilize any type of duplexing technique to divide communication channels (e.g., forward link, reverse link, . . . ) such as FDD, TDD, and the like.

Figure 2:
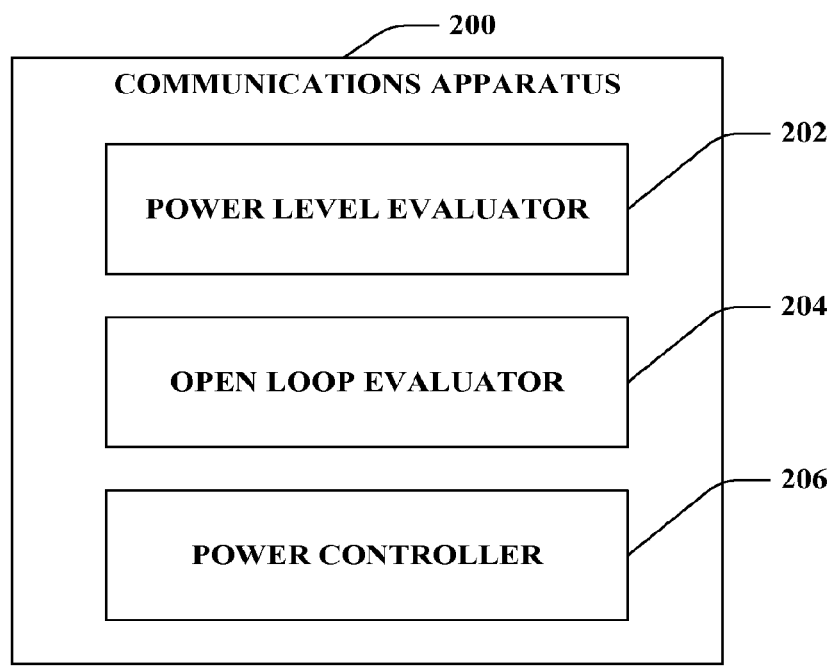
FIG. 2 is an illustration of an example communications apparatus for employment within a wireless communications environment.

Turning to FIG. 2, illustrated is a communications apparatus 200 for employment within a wireless communications environment. Communication apparatus 200 includes a power level evaluator 202 that determines a power level offset or adjustment value for a mobile device to employ to reduce or account for interference in a serving sector or a neighboring sector. According to one aspect of the subject disclosure, the power level evaluator of communications apparatus 200 evaluates the power level offset for the communication apparatus 200 itself. Power level evaluator 202 employs an interference level broadcasted from an access point or base station over a broadcast physical channel. In accordance with one example, the access point or base station broadcasting the interference level can be in the serving sector. However, it is to be appreciated that the broadcasted interference level may originate from a neighboring or non-serving sector. Power level evaluator 202, in general, evaluates an adjustment value that results in an increase in transmit power whenever communications apparatus 200 is subject to increased interference and evaluates an adjustment value that results in a decrease in transmit power whenever communications apparatus is subject to little or no interference 200.

Power level evaluator 202 may depend solely on the broadcasted interference level or a function thereof to determine a power adjustment value. However, it is to be appreciated that other factors can be considered in the power control decision. For example, power level evaluator 202 can employ the quality of service (QoS) level associated with data traffic of communication apparatus 200. A low latency QoS data traffic flow (i.e., traffic with tight latency requirements) requires power level evaluator 202 to respond aggressively in determining an adjustment value. In contrast, a high latency QoS traffic does not require power level evaluator 202 to respond as aggressively. Accordingly, power level evaluator 202 determines a smaller power adjustment increase for a best efforts QoS user in response to an interference burst but evaluates a higher power change in a high QoS level user (e.g., VoIP or other such application).

Further, power level evaluator 202 determines the adjustment value so that communications apparatus 200 is allowed to transmit at a power level that is as high as possible while keeping intra-sector (i.e., between mobile devices or terminals in the same sector) and inter-cell (i.e., between mobile devices or terminals in the different or neighboring sectors) interference to within acceptable limits. For example, communication apparatus 200 can be a mobile device located close to a serving access point or base station. Communications apparatus 200 can then transmit at a higher power level since communications apparatus 200 is less likely to cause interference to neighbor access point or base stations. Conversely, communications apparatus 200 may also located farther away from the serving base station and/or near a sector edge. In this situation, communications apparatus 200 is limited to a lower transmit power as it is more capable of causing high interference to neighboring base stations. Power level evaluator 202, when accounting for location of communications apparatus 200, can establish offset values that potentially reduce total interference observed by each access point while allowing particular qualified) mobile devices or terminals (i.e., located near a serving base station to achieve higher signal-to-noise ratios (SNR) and, thus, higher data rates.

According to an example, power level evaluator 202 may evaluate a power adjustment or offset value as follows:

$$P_{dch}(n) = P_{ref}(n) + \Delta P(n)$$

Pursuant to this illustration, $P_{dch}(n)$ is the transmit power spectral density (PSD) for the data channel for update internal n. $P_{ref}(n)$ is a reference PSD level for update interval n. The reference value may be obtained from a pilot channel or from channel reciprocity in a TDD implementation. However, it is to be appreciated that the reference power level can be obtained from other sources as known by one of ordinary skill in the art. ΔP(n) is a transmit PSD delta for update interval n. The PSD levels $P_{dch}(n)$, $P_{ref}(n)$ and the transmit power delta ΔP(n) are given in units of decibels, although it is to be appreciate that other units and/or calculations can be utilized.

The reference PSD level, $P_{ref}(n)$, can be the amount of transmit PSD required to achieve a target SNR or erasure rate for a designated transmission. The reference PSD level can be provided by a fixed channel (e.g., a channel quality feedback channel, request channel or the like). When the reference power level can achieve the target SNR or erasure rate, the received SNR for the other channel is estimated as follows:

$$SNR_{dch}(n)=SNR_{target}+\Delta P(n)$$

The data channel and the reference or control channel may have similar interference statistics. For example, interference statistics can be similar when control and data channels from different sectors interfere with one another. In such a case, the offset can be calculated at a terminal or mobile device. Additionally, the interference offset between the control channels and the data channels can be broadcasted by access points or base stations and power level evaluator 202 can employ the broadcasted offset.

Power level evaluator 202 can determine the transmit PSD for the data channel based upon various factors. For example, power level evaluator 202 can account for the amount of inter-sector interference communications apparatus 200 may cause to other terminals in neighboring sectors. Additionally, the amount of intra-sector interference communications apparatus 200 is causing to other terminals or mobile devices within the same sector. For example, data channels for each sector are multiplexed such that the data channels become orthogonal. Nonetheless, orthogonality may be lost as a result of inter-carrier interference (ICI), inter-symbol interference (ISI) and the like. Loss of orthogonality causes intra-sector interference. To mitigate this interference, power level evaluator 202 evaluates a power level adjustment such that the amount of intra-sector interference caused by communications apparatus 200 to other mobile devices within the same sector is maintained within an acceptable level. One way to achieve this, for example, is to constrain the transmit PSD delta, ΔP(n), as follows: $\Delta P(n) \in [\Delta P_{min}, \Delta P_{max}]$, wherein $\Delta P_{min}$ and $\Delta P_{max}$ is the minimum and maximum transmit PSD delta, respectively, allowed for a data channel. Furthermore, the maximum power level of communications apparatus 200 and other such factors can be accounted for in the power level decision by power level evaluator 202.

Power level evaluator 202, employing the delta-based power level adjustment described above or some other control mechanism, is effective in adjusting transmit power of communications apparatus 200 to control the amount of interference at neighboring sectors while communications apparatus 200 is continuously transmitting. However, power level evaluator 202 does not provide an initial set point for transmit power or power spectral density of communications apparatus 200. The initial set point is the transmit power or PSD value after some period of inactivity, commonly referred to as a silence period. By way of illustration, consider a partially loaded scenario. One base station or access point is serving a single bursty user that causing interference to a neighboring sector. A bursty user is characterized by communications having high volumes of data transmitted intermittently as opposed to transmitted as a steady stream. During the silence period, the delta PSD value of the bursty user may increase up to a maximum value as the neighboring access point or base station does not experience any interference during the silence period and, thus, does not transmit indications of large other sector interference (OSI). When the bursty user reverts into an active state, the burst transmission initially creates a significant amount of interference to the neighboring sector. This high interference continues until the bursty user has an opportunity to adjust the delta value to an appropriate in an update interval after transmission commences. As large interferences increases may result in packet errors or missed reverse link acknowledgment messages in the neighboring sector, a power adjustment should occur at the beginning of each burst.

Communications apparatus 200 includes an open loop evaluator 204 that performs open loop adjustments. Open loop evaluator 204 can determine the open loop adjustment at the beginning of each burst. However, according to an aspect of the subject disclosure, communications apparatus 200 may employ open loop evaluator 204 even when not scheduled on some interlaces (e.g., frames or portions of frames). In addition, open loop evaluator 204 can be employed to project a maximum value of the delta value to prevent the delta value from increasing due to little OSI activity. Open loop evaluator 204 can determine the open loop delta value directly or based upon bandwidth assigned for transmission.

Accordingly to an example, open loop evaluator 204 may determine an open loop value to control maximum PSD rise. Open loop evaluator 204 may compute the delta value such that the following is satisfied:

$$(averageIOT+pCoT*delta)/averageIOT<maxIOTRise$$

Pursuant to this illustration, averageIOT is an interference offset value that is a system parameter. This value may be broadcasted by the non-serving sector access point for which the open loop adjustment is being determined. In accordance with another aspect, the averageIOT value may be from the sector having the smallest channel gain difference with the serving sector. pCoT is a measurement of received signal power on a reference channel at the non-serving sector. The measurement can be, for example, a received carrier PSD over thermal PSD. Further, the reference channel can be reverse link pilot channel, channel quality indicator channel, or any such reference channel. The value, pCoT, can be communicated over a dedicated forward link channel (e.g., a forward link pilot quality channel (F-PQICH)) from the non-serving sector and obtained by appropriately adjusting the corresponding value for the serving sector using the channel gain difference values. The parameter maxIOTRise indicates the maximum allowable rise in the amount of interference caused by any access terminal or mobile device at a non-serving sector. This parameter can be a system configuration, overhead provide value or the like.

In the event that the delta value determined in the manner described above is smaller than the minimum delta value, $delta_{min}$, a maximum supportable bandwidth, $W_{max}$, may be allocated downwards. The allocation can be based on a predetermined value or based upon the following:

$$(averageIOT+W_{max}/W_{tot}*pCoT*delta_{min})/averageIOT<maxIOTRise$$

In this example, $W_{tot}$, is the total system bandwidth.

Accordingly to another example, open loop evaluator 204 may determine an open loop value to control maximum PSD rise based upon an assigned bandwidth, W. Open loop evaluator 204 may compute the delta value such that the following is satisfied:

$$(averageIOT+W/W_{tot}*pCoT*delta)/averageIOT<maxIOTRise$$

Pursuant to yet another illustration, open loop evaluator 204 may control the amount of interference at the beginning of each burst transmission by limiting the initial maximum supportable bandwidth based on a current value of delta for controlling the average PSD rise. In the example, open loop evaluator 204 may determine $W_{max}$ such that the following holds true:

$$(averageIOT + W_{max}/W_{tot} * pCoT * delta) / averageIOT < maxIOTRise$$

The determined $W_{max}$ value can be communicated to the serving access point of communications apparatus 200. The scheduler of the serving access point can gradually increase the bandwidth over subsequent assignments to allow sufficient time for OSI indications to result in adjustments to the delta value.

After determining an appropriate power level, power level evaluator 202 or open loop evaluator 204, conveys the appropriate power level to power controller 206 of communications apparatus 206. Power controller 206 sets the power level of transmissions of communications apparatus 206 based upon the information conveyed by power level evaluator 202 and/or open loop evaluator 204. Communications apparatus 200 operates at the new power level until the evaluators 202 and 204 determine that interference changes warrant another adjustment.

Moreover, although not shown, it is to be appreciated that communications apparatus 200 may include memory that retains instructions with respect to determining power level adjustments from broadcasted interference levels, determining open loop power levels as initial set points prior to commencement of burst traffic, controlling power levels over a reverse link based on the determine power level adjustments and/or open loop values, and the like. Further, communications apparatus 200 may include a processor that may be utilized in connection with executing instructions (e.g., instructions retained within memory, instructions obtained from a disparate source, . . . ).

Figure 3:
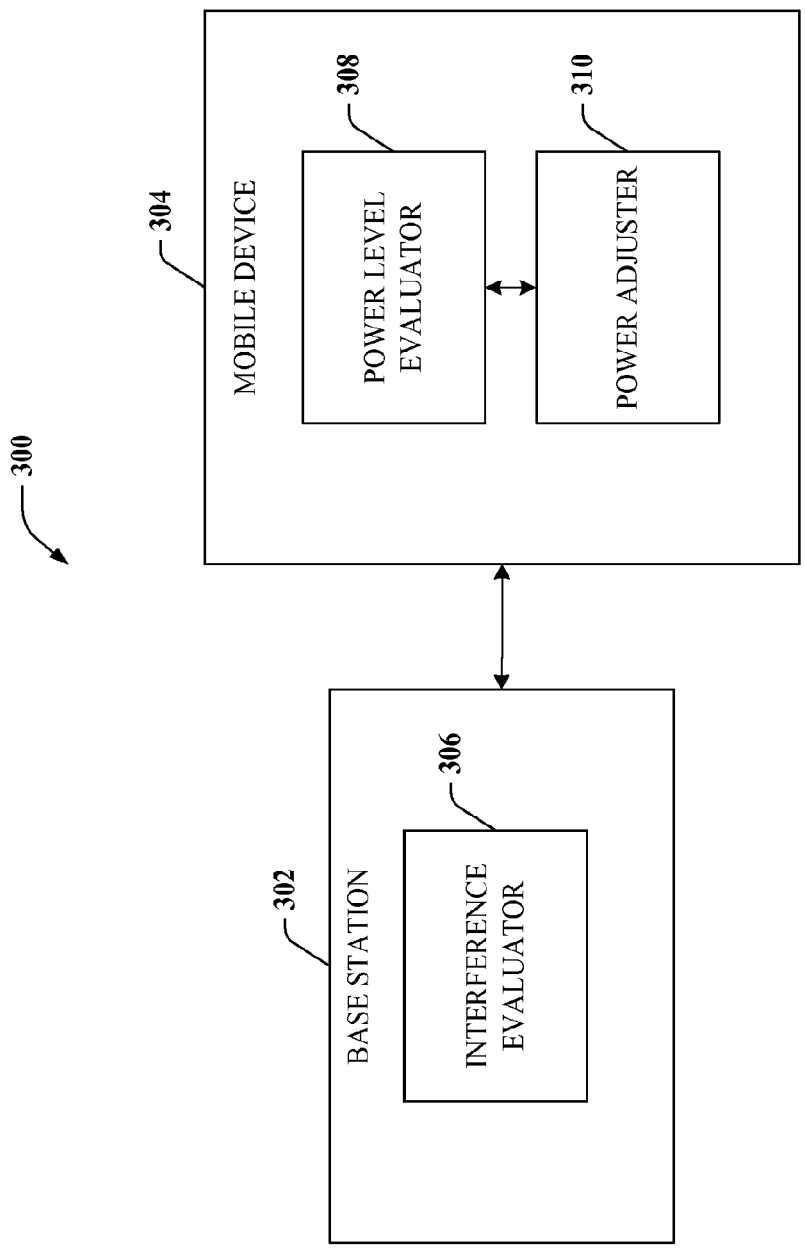
FIG. 3 is an illustration of an example wireless communications system that effectuates power control based upon an interference level broadcast.

Turning now to FIG. 3, illustrated is a wireless communications system 300 that effectuates power adjustment based upon considerations of broadcasted interference levels. System 300 includes a base station 302 that communicates with a mobile device 304 (and/or any number of disparate mobile devices (not shown)). Base station 302 may transmit information to mobile device 304 over a forward link channel; further base station 302 may receive information from mobile device 304 over a reverse link channel. Moreover, system 300 may be a MIMO system.

Mobile device 304 may includes a power level evaluator 308 and a power adjuster 310. Mobile device 304 receives interference indications from base stations 302. Power level evaluator 308 utilizes the interference indications to evaluate any required power adjustments. Power level evaluator 308 can determine power level delta values and/or open loop delta values as described supra with reference to FIG. 2. Power adjuster 310 employs the adjustment values determined by the power level evaluator 308 to alter the power level of reverse link transmissions of mobile device 304 to base station 302.

The amount of inter-cell interference caused by a given mobile device, such as mobile device 304, is determined by the transmit power level used by the mobile device and the location of the mobile device relative to access points or base stations in neighboring non-serving sectors. Base station 302 is the serving base station of mobile device 304. Base station 302 broadcasts interference information on a broadcast physical channel of wireless system 300, which is received by mobile device 304 and other mobile devices served by base station 302. For example, base station 302 may broadcast interference parameters on a broadcast physical channel. In accordance with another aspect, base station 302 broadcasts interference information every small number of slots to facilitate quick power adjustment to subsequent hybrid automatic repeat transmissions (HARQ) made for on-going packet transmissions. A HARQ retransmission interval is a multiple of slots where a slot is the time duration for a single HARQ sub-packet transmission. Retransmission of high QoS packets can be adjusted in the event of a sudden rise in interference. The broadcasts should be frequent to provide opportunities for power changes. Moreover, interference information is a function of frequency such that multiple indications are broadcasted for multiple subcarrier clusters. For example, multiple values may be broadcasted in OFDMA, LFDMA and the like since multiple access is done in the frequency domain.

Base station 302 includes an interference evaluator 306 that measures an interference level. The interference level, for example, can indicate the amount of interference received by base station 302 as a result of mobile device operating in non-serving sectors. The measured interference level can be compared to thermal or the like and used as an input in the generation of the indication broadcasted. According to one aspect of the subject disclosure, interference evaluator 306 can utilize interference over thermal (IOT) or rise over thermal (RoT). It should be appreciated that other similar interference metrics can be employed. The interference information broadcasted by base station 302 is utilized by mobile device 304 to adjust transmit power to maintain, for example, a target carrier to interference ratio (C/I), signal-to-noise ratio (SNR), or other such interference type target.

The broadcasted interference information may comprise an instantaneous interference level. However, if mobile devices, such as mobile device 304, utilize the instantaneous level to adjust transmit power, wireless system 300 can enter into a race condition. For example, bursty traffic arriving at an access terminal or base station in a neighboring sector results in a interference increase in other sectors such as the sector served by base station 302. Base station 302 broadcasts this increase to mobile device 304 and other mobile devices served. As a result of the interference increase, mobile device 304 and others will increase power. The increase in power also raises interference for the original bursty traffic in the neighboring sector. Accordingly, the bursty traffic may also increase in power and so on resulting in decrease overall throughput. The wireless system can ultimately become unstable Accordingly, base station 302 broadcasts a function of the interference level determined by interference evaluator 306 to enable mobile devices served to control power levels while mitigating power racing conditions. Pursuant to one aspect, the function of the interference level, for example an IOT level, can be a minimum of a received IOT value or a IOT threshold value for a power control algorithm (e.g., to control a power rise or delta value, to calculate offset values such as delta values, etc.). In addition, the interference value can be a minimum of a received IOT or a IOT ramp, where the IOT ramp limits the maximum IOT slew. Further, in accordance with yet another aspect, the IOT value, utilized as an interference value, can be broadcasted as a filtered value, IOT_filtered, where the filter can be one of a finite impulse response (FIR) or infinite impulse response (IIR). It should be appreciated that other such functions of interference level can be employed provided that resultant broadcasted information enables mobile devices to adjust power levels while mitigating race conditions.

Figure 4:
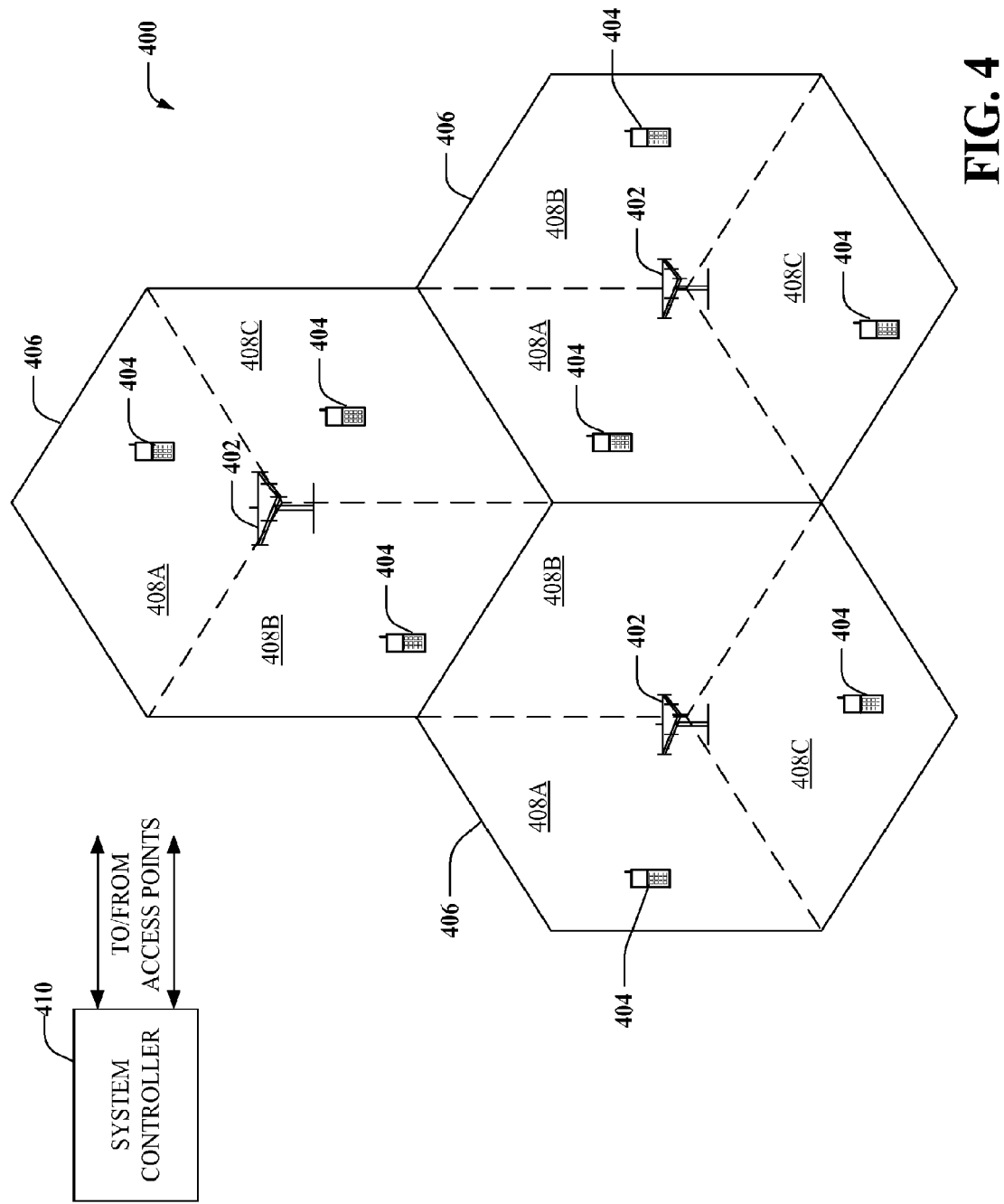
FIG. 4 is an illustration of a wireless communication system in accordance with one or more aspects presented herein.

Referring now to FIG. 4, a wireless communication system 400 in accordance with various aspects presented herein is illustrated. System 400 can comprise one or more access points 402 that receive, transmit, repeat, etc., wireless communication signals to each other and/or to one or more terminals 404. Each base station 402 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 404 can be, for example, cellular phones, smart phones, laptops, handheld communication devices, handheld computing devices, satellite radios, global positioning systems, PDAs, and/or any other suitable device for communicating over wireless system 400. In addition, each terminal 404 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 4, each access point provides communication coverage for a particular geographic area 406. The term "cell" can refer to an access point and/or its coverage area, depending on context. To improve system capacity, an access point coverage area can be partitioned into multiple smaller areas (e.g., three smaller areas 408A, 408B and 208C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 404 are typically dispersed throughout system 400. Each terminal 404 may be fixed or mobile. Each terminal 404 may communicate with one or more access points 402 on the forward and reverse links at any given moment.

For a centralized architecture, a system controller 410 couples access points 402 and provides coordination and control of access points 402. For a distributed architecture, access points 402 may communicate with one another as needed. Communication between access points via system controller 410 or the like can be referred to as backhaul signaling.

The techniques described herein may be used for a system 400 with sectorized cells as well as a system with un-sectorized cells. For clarity, the following description is for a system with sectorized cells. The term "access point" is used generically for a fixed station that serves a sector as well as a fixed station that serves a cell. The terms "terminal" and "user" are used interchangeably, and the terms "sector" and "access point" are also used interchangeably. A serving access point/sector is an access point/sector with which a terminal communicates. A neighbor access point/sector is an access point/sector with which a terminal is not in communication.

Figure 5:
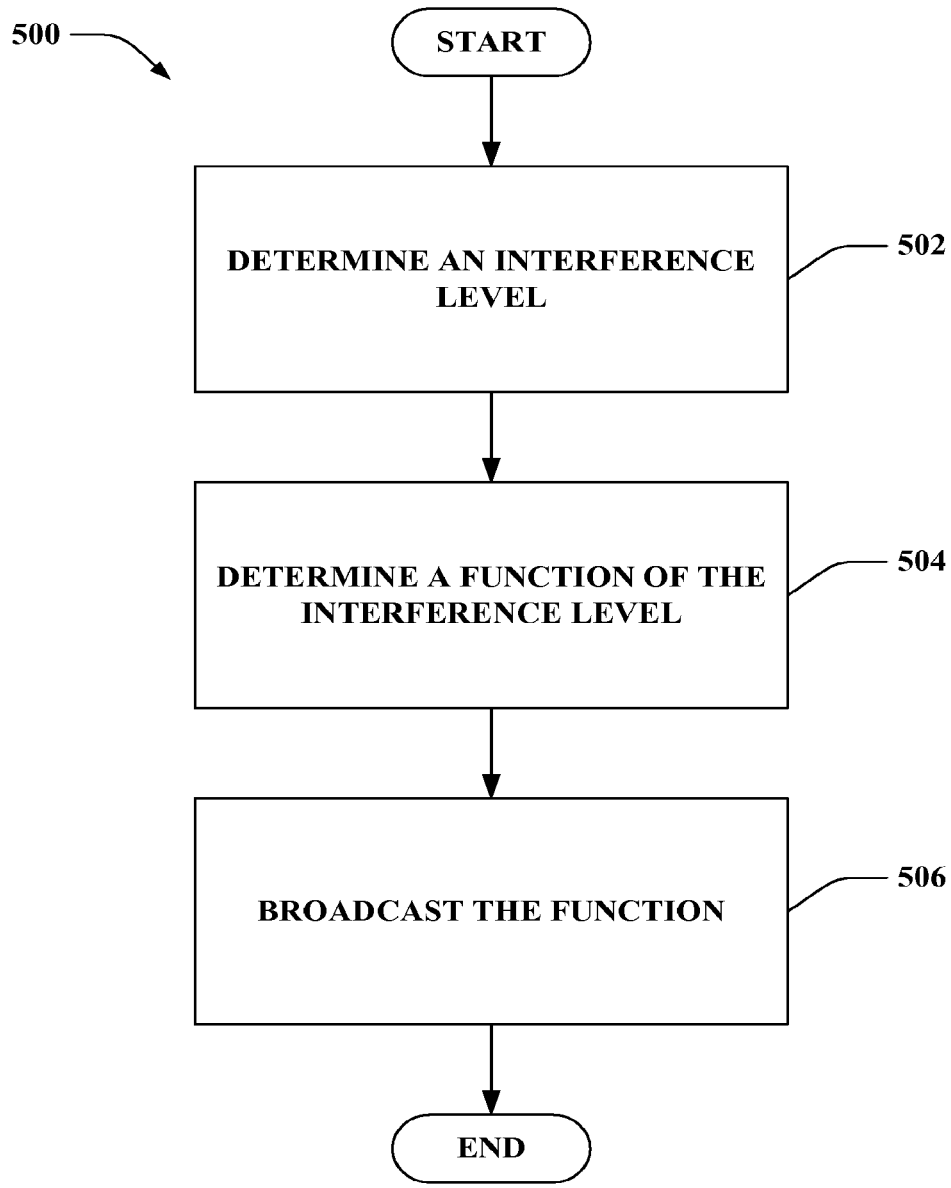
FIG. 5 is an illustration of an example methodology that facilitates broadcasting an interference level for power adjustments.
Figure 6:
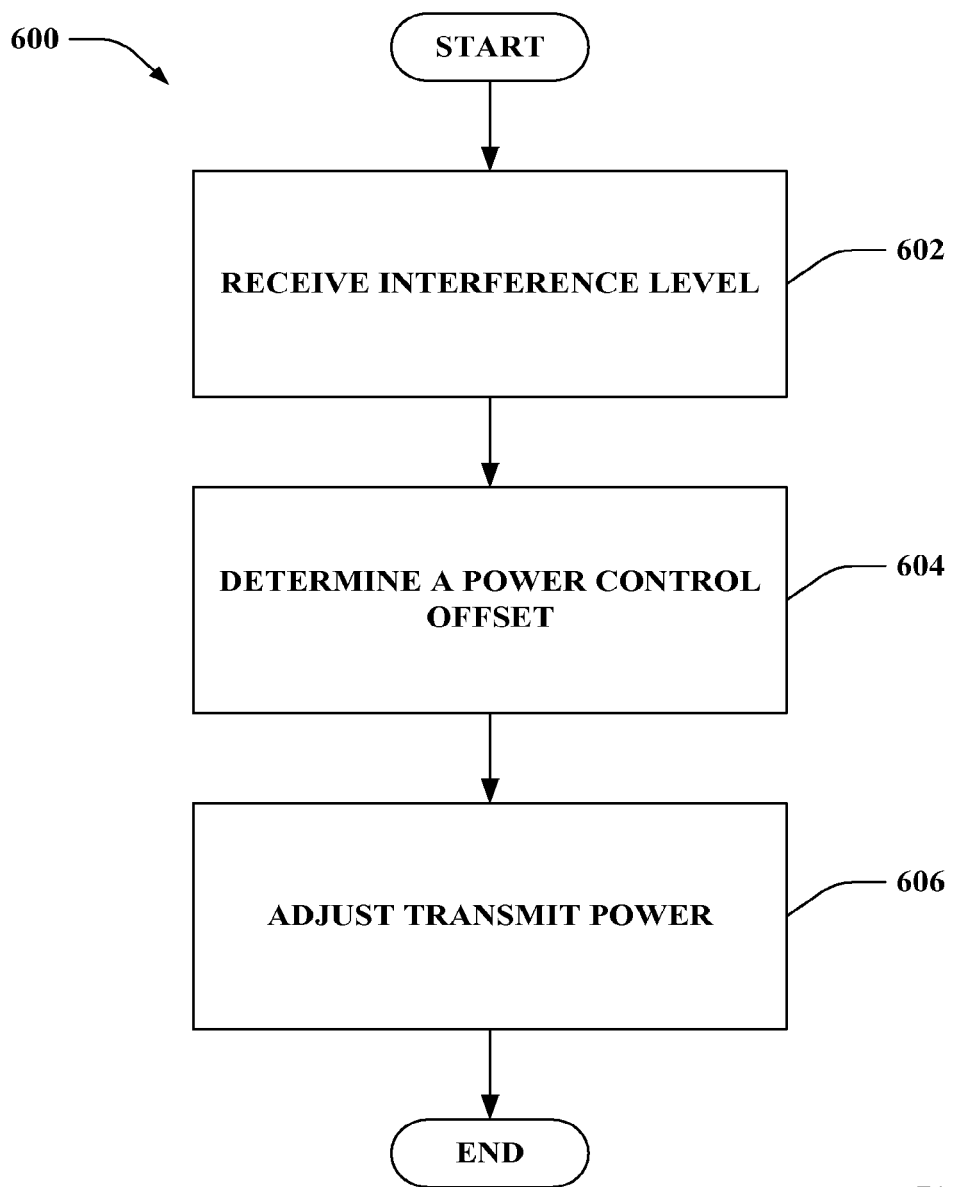
FIG. 6 is an illustration of an example methodology that facilitates adjusting transmit power based upon an interference level broadcast.
Figure 7:
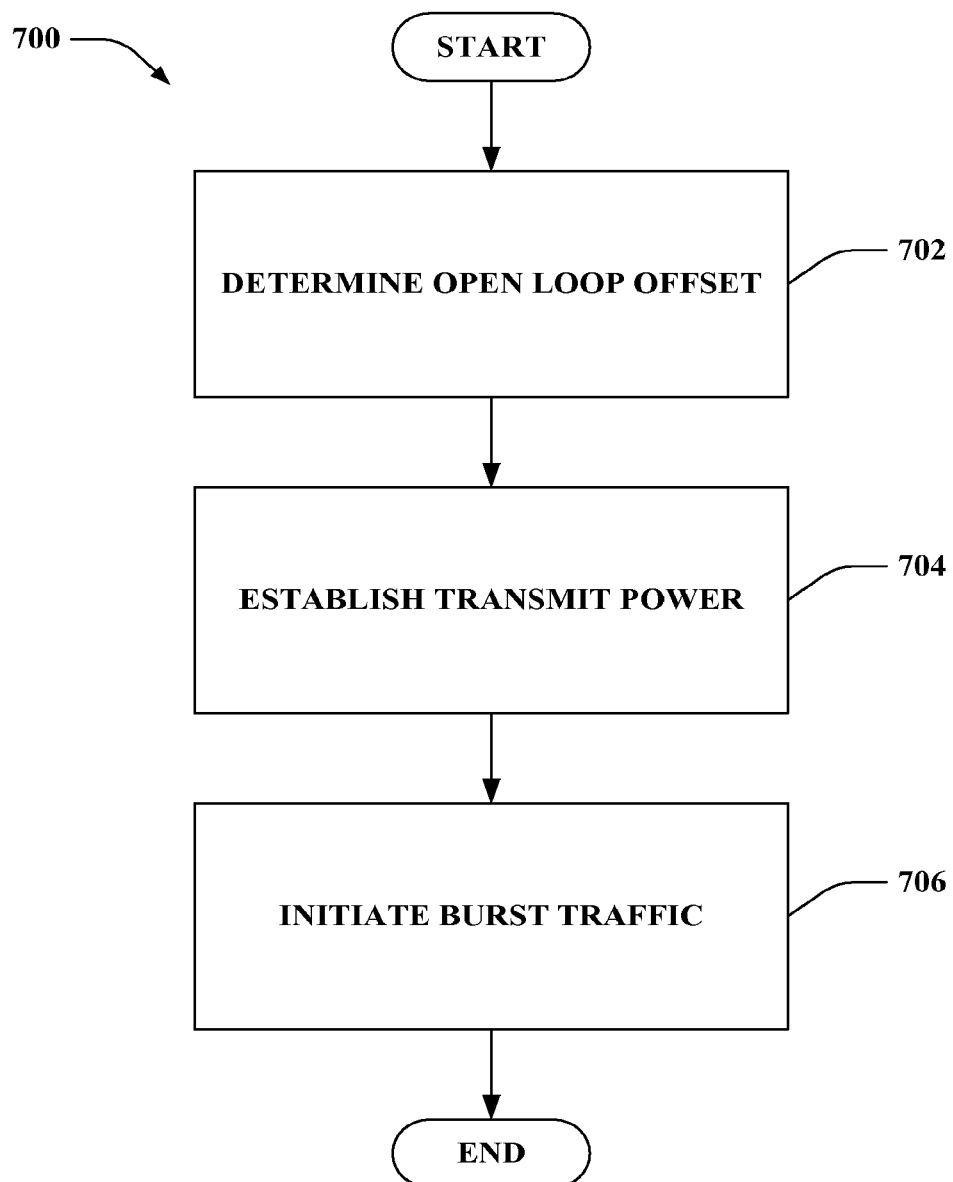
FIG. 7 is an illustration of an example methodology that facilitates reducing interference caused by an initial burst transmission.

Referring to FIGS. 5-7, methodologies relating to reverse link power adjustment based upon broadcasted interference information. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates broadcasting interference information in a wireless communication system. At reference numeral 502, an interference level is determined. The interference level can be interference received by an access point or base station or the value can be transmitted by other access points or base stations over the backhaul. In accordance with one aspect, the interference level is represented as an interference over thermal (IOT) value. At reference numeral 504, a function of the interference level is determined Utilizing solely the interference level determined at 502 may result in racing conditions among mobile devices. Employing a function of the interference level mitigates racing. The function can be an average IOT, a minimum between received IOT and a threshold, a minimum between received IOT and an IOT ramp value, a filtered IOT value or other such function. At reference numeral 506, the function of the interference level is broadcasted. The function can be broadcasted on a physical broadcast channel from a base station to a plurality of mobile devices.

Turning to FIG. 6, illustrated is a methodology 600 that facilitates adjusting transmit power level based upon considerations of broadcasted interference information. At reference numeral 602, interference information is received. The interference information can include an interference over thermal value or a function thereof. At reference numeral 604, a power control offset is determined. The offset is determined based upon considerations of the interference information received. The received information is employed to map an interference target (e.g., target C/I, target SNR, etc.) to a PSD value. The PSD value, for example, can be employed as the power control offset utilized to adjust transmit power in accordance with the received interference information. At reference numeral 606, transmit power is adjusted based upon the determined power control offset.

Now referring to FIG. 7, illustrated is a methodology 700 that facilitates setting an initial transmit power level prior to commencing bursty traffic. At reference numeral 702, an open loop offset is evaluated. The open loop offset value is a projected power level adjustment determined during a silence period to prevent a large sudden increase in interference. At 704, a transmit power is established in accordance with the open loop offset value. At reference numeral 706, burst traffic is initiated utilizing the adjusted power level to mitigate initial interference increase. After commencement of the burst traffic, power control may occur as described supra with reference to FIGS. 5 and 6.

It will be appreciated that, in accordance with one or more aspects described herein, inferences can be made regarding determining interference levels, determining which functions of interference levels to employ, determining power level adjustments based upon considerations of broadcasted interference information, determining relevant parameters for power level decisions, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to evaluating an interference level and choosing a function of the interference level to mobile devices via a broadcast. By way of further illustration, an inference may be made related to determining a power level adjustment on a reverse link transmission based upon consideration of broadcasted interference information. It will be appreciated that the foregoing examples are illustrative in nature and are not intended to limit the number of inferences that can be made or the manner in which such inferences are made in conjunction with the various embodiments and/or methods described herein.

Figure 8:
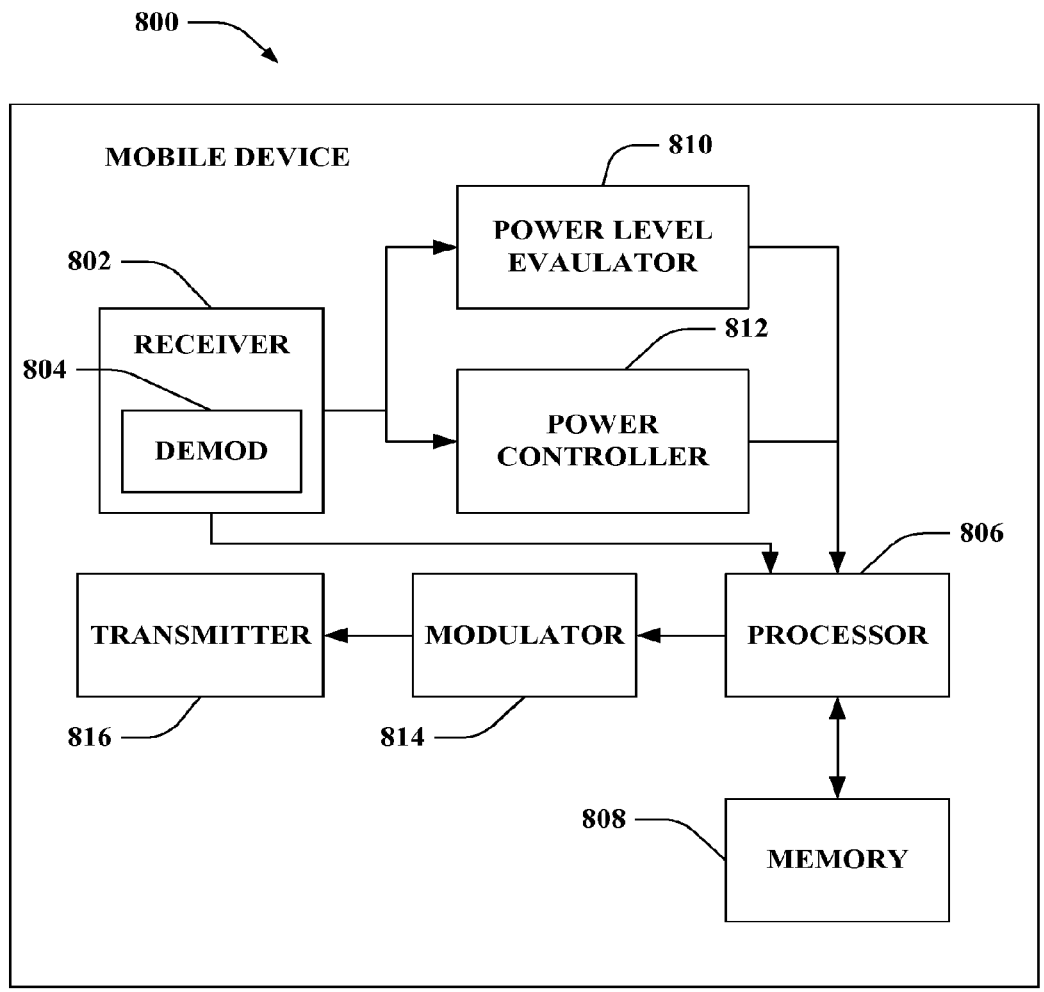
FIG. 8 is an illustration of an example mobile device that facilitates determining a power level offset value and adjusting a power level.

FIG. 8 is an illustration of a mobile device 800 that facilitates adjusting reverse link power based upon considerations of broadcasted interference information. Mobile device 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that may store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a power level evaluator 810 that determines a power level adjustment for mobile device 800 based upon broadcasted interference information from a base station. The broadcasted interference information may comprise an interference level and/or a function thereof. For example, the interference information can be a function comprising a minimum of a received IOT value and a IOT threshold for a wireless system. Power level evaluator 810 uses the interference information to correspond target interference metrics to a delta power level value or PSD. Additionally, a power controller 812 may utilize the delta power level value or PSD evaluated by power level evaluator 810 to modify the transmit power level of mobile device 800. Mobile device 800 still further comprises a modulator 814 and a transmitter 816 that transmits a signal (e.g., base CQI and differential CQI) to, for instance, a base station, another mobile device, etc. Although depicted as being separate from the processor 806, it is to be appreciated that power level evaluator 810, power controller 812 and/or modulator 814 may be part of processor 806 or a number of processors (not shown).

Figure 9:
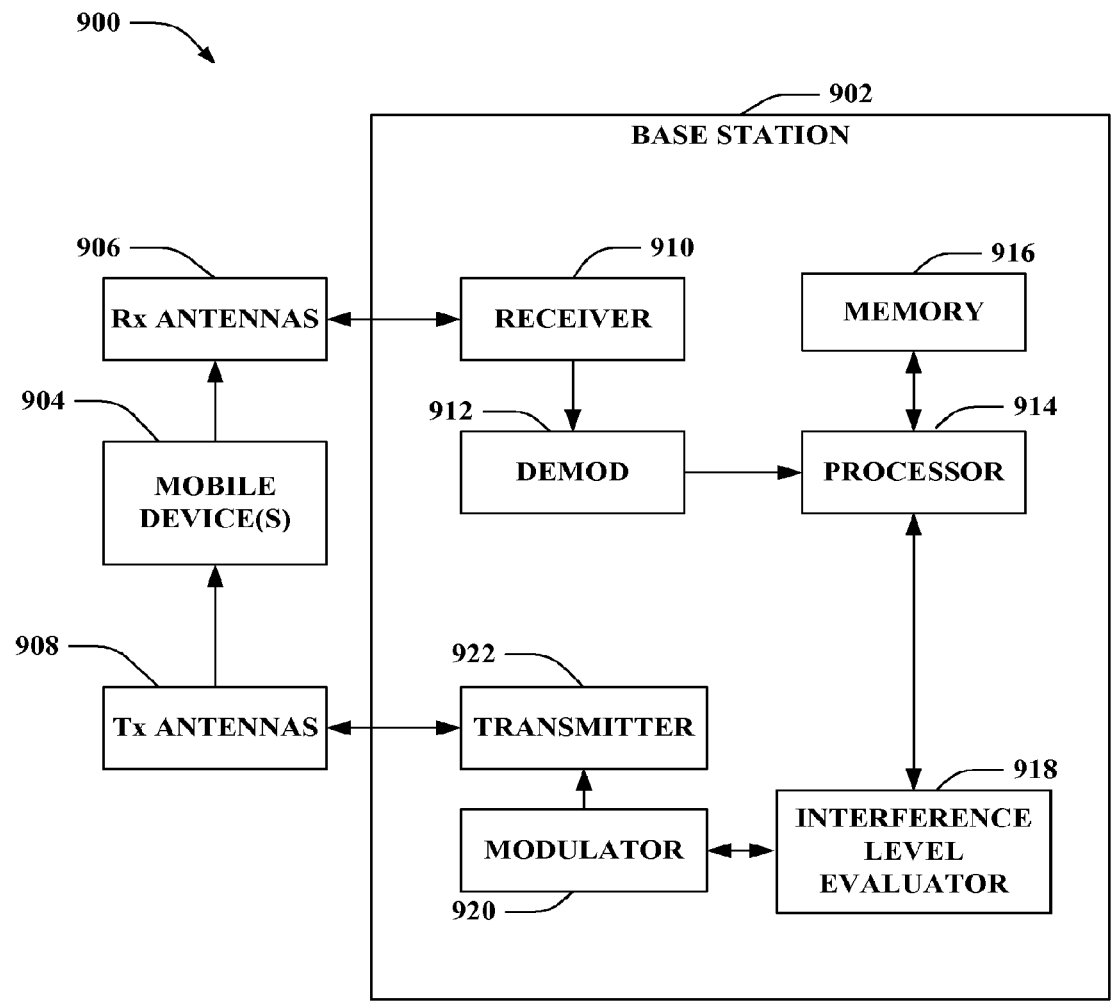
FIG. 9 is an illustration of an example system that facilitates generating a interference level broadcast to control power level adjustments.

FIG. 9 is an illustration of a system 900 that facilitates reducing the amount of feedback required to control forward link transmission in a MIMO system implementing a PGRC scheme. System 900 comprises a base station 902 (e.g., access point, . . . ) with a receiver 910 that receives signal(s) from one or more mobile devices 904 through a plurality of receive antennas 906, and a transmitter 920 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to an interference level evaluator 918 that determines a level of receive interference and/or a function thereof. Interference level evaluator 918 evaluates the interference level or receives a value over the backhaul from neighboring sectors. For example, interference level evaluator 918 may measure the interference received and compare it to thermal to generate an interference level such as IOT.

Interference level evaluator 918 is coupled to transmitter 922 through modulator 920. The interference level determined by interference level evaluator 918 is broadcasted by transmitter 922 through transmit antennas 908 to mobile device(s) 904. Modulator 920 can multiplex the control information for transmission by a transmitter 922 through antenna 908 to mobile device(s) 904. Mobile devices 904 can be similar to mobile device 800 described with reference to FIG. 8 and employ the broadcasted information to adjust power levels on the reverse link. Interference level evaluator 918 may instruct a function of the interference level to be broadcasted as opposed to the instantaneous interference level to mitigate racing conditions. For example, the interference information broadcasted can be a minimum of a received IOT or a IOT ramp, where the IOT ramp limits the maximum IOT slew. It should be appreciated that other functions can be utilized in accordance with the subject disclosure. Although depicted as being separate from the processor 914, it is to be appreciated that interference level evaluator 918 and/or modulator 920 may be part of processor 914 or a number of processors (not shown).

Figure 10:
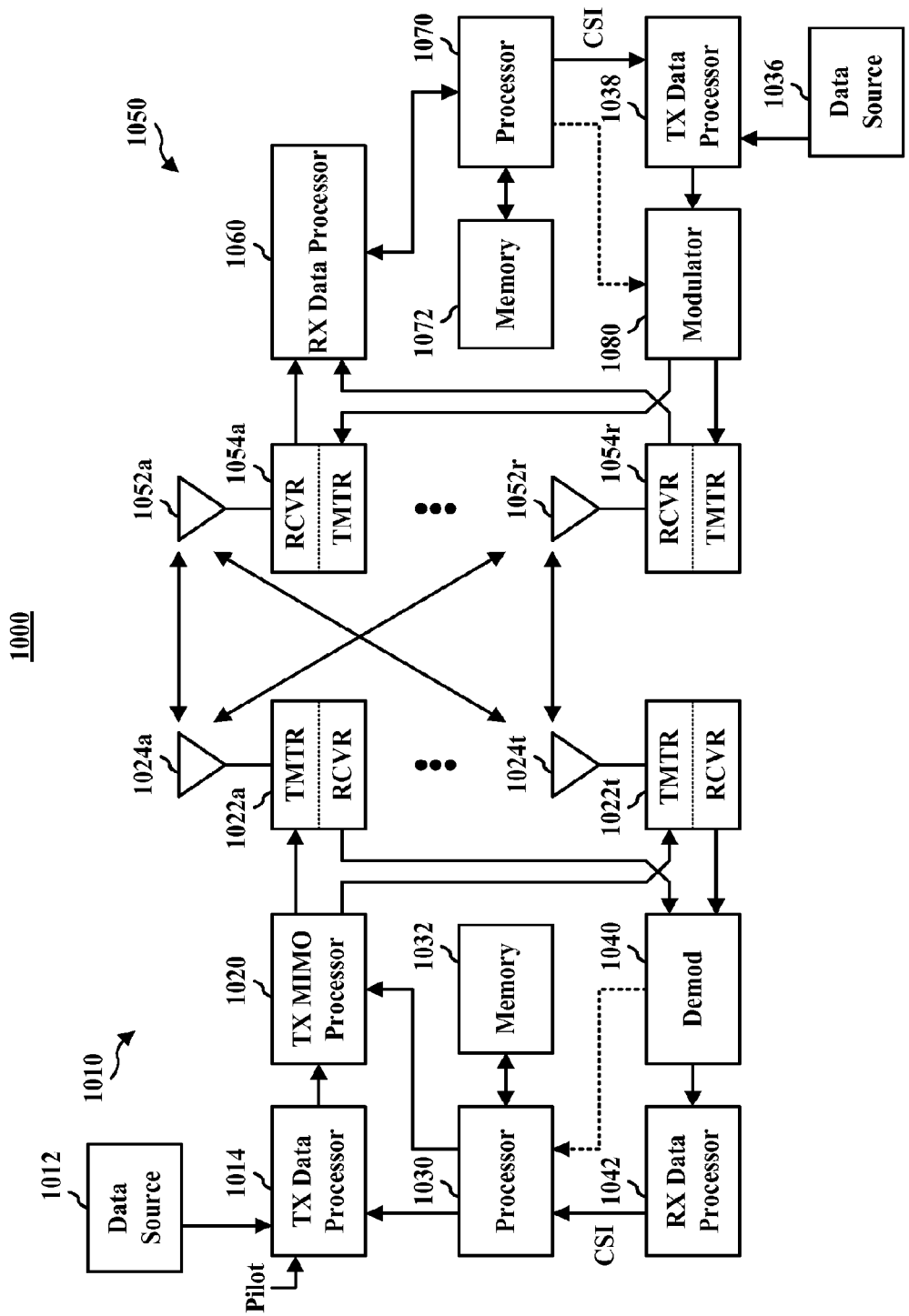
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 may include more than one base station and/or more than one mobile device, wherein additional base stations and/or mobile devices may be substantially similar or different from example base station 1010 and mobile device 1050 described below. In addition, it is to be appreciated that base station 1010 and/or mobile device 1050 may employ the systems (FIGS. 1-4 and 8-9) and/or methods (FIGS. 6-7) described herein to facilitate wireless communication there between.

At base station 1010, traffic data for a number of data streams is provided from a data source 1012 to a transmit (TX) data processor 1014. According to an example, each data stream may be transmitted over a respective antenna. TX data processor 1014 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1050 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1030.

The modulation symbols for the data streams may be provided to a TX MIMO processor 1020, which may further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 may receive and process the $N_R$ received symbol streams from $N_R$ receivers 1054 based on a particular receiver processing technique to provide $N_T$ "detected" symbol streams. RX data processor 1060 may demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 may periodically determine which precoding matrix to utilize as discussed above. Further, processor 1070 may formulate a reverse link message comprising a matrix index portion and a rank value portion.

The reverse link message may comprise various types of information regarding the communication link and/or the received data stream. The reverse link message may be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 may process the extracted message to determine which precoding matrix to use for determining the beamforming weights.

Processors 1030 and 1070 may direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 11:
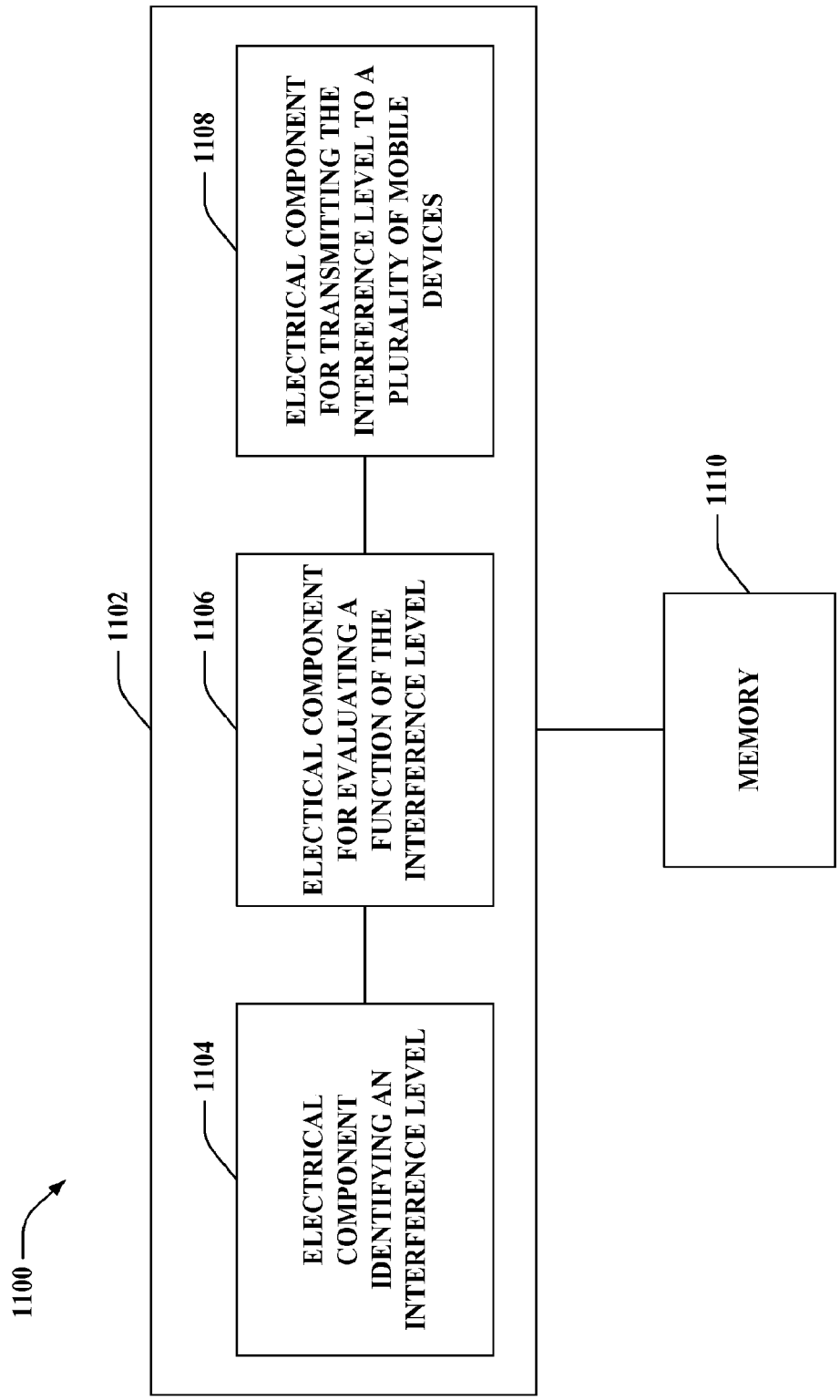
FIG. 11 is an illustration of an example system that facilitates generating an interference indication.

With reference to FIG. 11, illustrated is a system 1100 that facilitates generates an interference indication to be broadcasted to a plurality of mobile devices. For example, system 1100 may reside at least partially within a base station. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for identifying an interference level 1104. For example, mobile devices in non-serving sectors cause interference to a base station in a neighboring sector. Further, logical grouping 1102 may comprise an electrical component for evaluating a function of the interference level 1106. For example, a minimum between an interference value received at a base station and an interference threshold value can be determined. Employing a function value of the interference level mitigates racing conditions that may result when utilizing instantaneous interference level values alone. Moreover, logical grouping 1102 may include an electrical component for transmitting the interference level to a plurality of mobile devices 1108. According to an example, a broadcast physical channel can be employed to convey the interference level and/or a function thereof to all mobile devices within a serving sector. Additionally, system 1100 may include a memory 1110 that retains instructions for executing functions associated with electrical components 1104, 1106, and 1108. While shown as being external to memory 1110, it is to be understood that one or more of electrical components 1104, 1106, and 1108 may exist within memory 1110.

Figure 12:
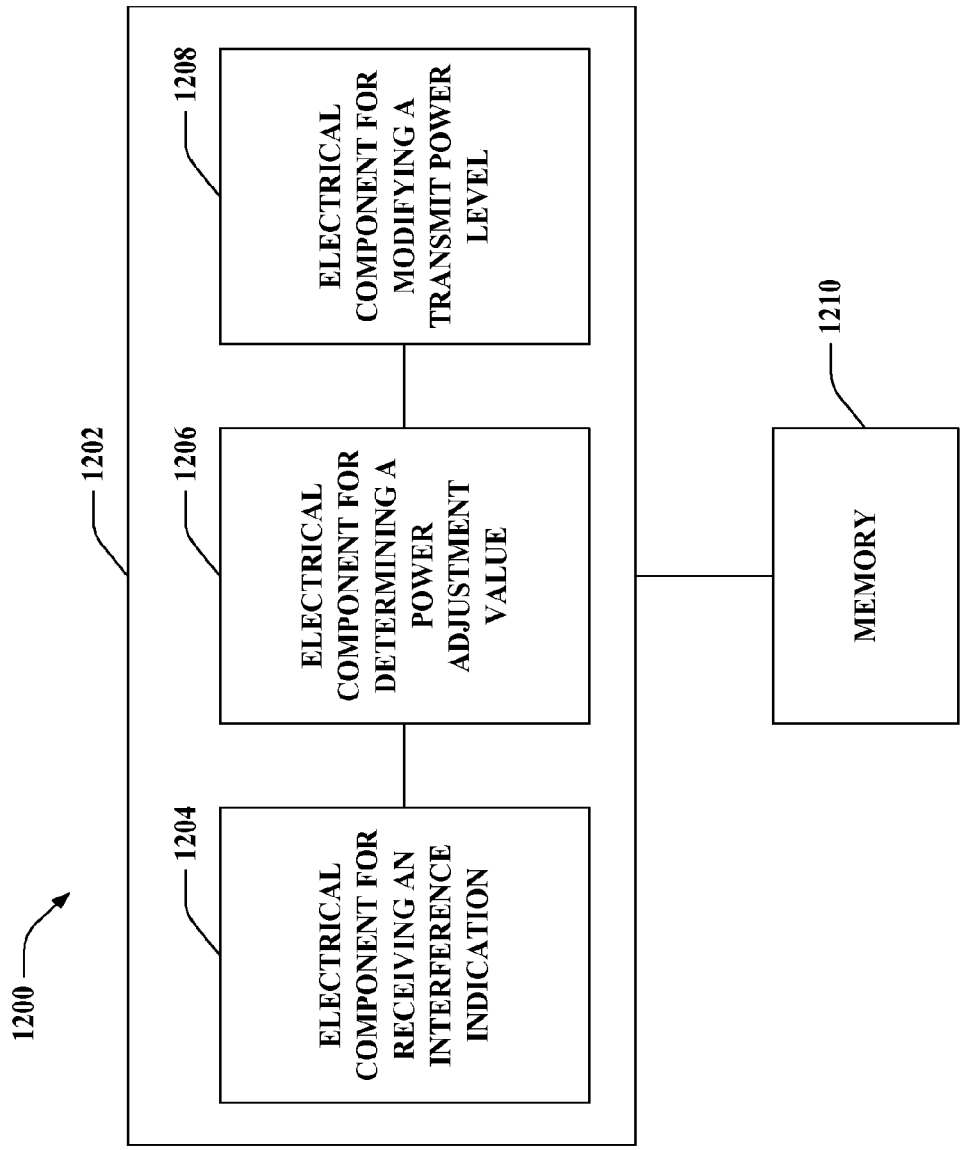
FIG. 12 is an illustration of an example system that facilitates power level adjustment.

Turning to FIG. 12, illustrated is a system 1200 that adjusts power on a reverse link. System 1200 may reside within a mobile device, for instance. As depicted, system 1200 includes functional blocks that may represent functions implemented by a processor, software, or combination thereof (e.g., firmware). System 1200 includes a logical grouping 1202 of electrical components that facilitate controlling forward link transmission. Logical grouping 1202 may include an electrical component for receiving an interference indication 1204. For example, a receiver antenna can be included in a mobile device through which broadcasted signals from a serving base station can be captured and processed. The interference indication includes information related to interference received at a serving base station caused by activity of other mobile devices in non-serving sectors. Moreover, logical grouping 1202 may include an electrical component for determining a power adjustment value 1206. For example, the power adjustment value is evaluated based upon the received interference indication. According to one aspect, a power adjustment value that indicates power should be increased can be evaluated when the interference indication shows an increase in interference. The power increase allows a mobile device to achieve a target SNR (or other such target type) despite the increased interference. Further, logical grouping 1202 may comprise an electrical component for modifying a transmit power level 1208. After evaluating the power adjustment value, the transmitter on the reverse link of a mobile device can be modified by altering the power employed in accordance with the adjustment value. Additionally, system 1200 may include a memory 1210 that retains instructions for executing functions associated with electrical components 1204, 1206, and 1208. While shown as being external to memory 1210, it is to be understood that electrical components 1204, 1206, and 1208 may exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates adjusting power based upon interference information, the method comprising:
   receiving an interference indication;
   evaluating a first power adjustment value based at least in part on the received interference indication;
   adjusting transmit power on the reverse link based upon the first power adjustment value; and
   determining an open loop power adjustment value during periods of inactivity, wherein the open loop power adjustment value controls a maximum value of the first power adjustment value during the periods of inactivity.

2. The method of claim 1, further comprising utilizing the open loop power adjustment to modify a transmit power level prior to burst data traffic.

3. The method of claim 1, wherein evaluating the first power adjustment value comprises evaluating the first power adjustment value based upon quality of service (QoS) parameters.

4. The method of claim 1, wherein evaluating the first power adjustment value comprises evaluating the first power adjustment value based upon a location of a mobile device relative to non-serving base stations.

5. The method of claim 4, wherein transmit power on the reverse link increases as a distance to non-serving base station increases.

6. A wireless communications apparatus, comprising:
   a memory that retains instructions related to processing an interference value on a broadcast channel, inferring a first power adjustment value based upon the interference value, changing a power level according to the power adjustment value, and determining an open loop power adjustment value during periods of inactivity, wherein the open loop power adjustment value controls a maximum value of the first power adjustment value during the periods of inactivity; and
   an integrated circuit coupled to the memory, configured to execute the instructions retained in the memory.

7. A wireless communications apparatus that adjusts power on a reverse link, the wireless communications apparatus comprising:
   means for receiving an interference indication from a broadcast channel;
   means for determining a first power adjustment value based upon the interference indication;
   means for modifying a transmit power level in accordance with the first power adjustment value; and
   means for determining an open loop power adjustment value during periods of inactivity, wherein the power adjustment value controls a maximum value of the first power adjustment value during the periods of inactivity.

8. The wireless communications apparatus of claim 7, further comprising:
   means for evaluating an initial transmit power set point prior to transmission; and
   means for adjusting reverse link power level according to the initial power set point.

9. A non-transitory computer-readable medium, comprising:
   code for causing a computer to receive a broadcasted interference value;

code for causing a computer to evaluate a power correction parameter based at least in part on the received interference value;

code for causing a computer to modify transmit power on the reverse link based upon the power correction value; and code for causing a computer to determine an open loop power adjustment value during periods of inactivity, wherein the power adjustment value controls a maximum value of the power correction parameter during the periods of inactivity.

10. The computer-readable medium of claim 9, further comprising code for utilizing the open loop power adjustment value to modify a transmit power level prior to burst data traffic.

11. The computer-readable medium of claim 9, wherein the code for evaluating the power correction parameter comprises code for evaluating the power correction parameter based upon quality of service (QoS) parameters.

12. The computer-readable medium of claim 9, wherein the code for evaluating the power correction parameter comprises code for evaluating the power correction parameter based upon a location of to at least one non-serving base station.

13. The computer-readable medium of claim 12, wherein transmit power on the reverse link increases as a distance to the at least one non-serving base station increases.

14. In a wireless communication system, an apparatus comprising:
   an integrated circuit configured to:
      evaluate a power adjustment quantity based at least in part upon consideration of broadcasted interference values related to non-serving sectors;
      adjust a transmit power level on a reverse link in accordance with the power adjustment quantity; and
      determine an open loop power adjustment value during periods of inactivity, wherein the open loop power adjustment value controls a maximum value of the power adjustment quantity during the periods of inactivity.

15. The method of claim 1, wherein the interference indication comprises an interference value determined as the output of a function with a received interference over thermal (IOT) value as the input.

16. The wireless communications apparatus of claim 6, wherein the interference indication comprises an interference value determined as the output of a function with a received interference over thermal (IOT) value as the input.

17. The wireless communications apparatus of claim 7, wherein the interference indication comprises an interference value determined as the output of a function with a received interference over thermal (IOT) value as the input.

* * * * *